United States Patent [19]

Reinwall, Jr.

[11] 4,187,658
[45] Feb. 12, 1980

[54] PANEL CLAMP

[75] Inventor: Ernest W. Reinwall, Jr., McHenry, Ill.

[73] Assignee: Illinois Tool Works Inc., Chicago, Ill.

[21] Appl. No.: 841,251

[22] Filed: Oct. 11, 1977

Related U.S. Application Data

[63] Continuation of Ser. No. 688,199, May 20, 1976.

[51] Int. Cl.² ............................................. E04B 5/52
[52] U.S. Cl. ....................................... 52/489; 403/406
[58] Field of Search ................. 52/283, 289, 489, 702;
248/300, 316 D, 226.5, 301, 488; 220/4 F, 77,
324; 217/12, 43

[56] References Cited

U.S. PATENT DOCUMENTS

| 155,969 | 10/1874 | Perkins | 403/399 |
|---|---|---|---|
| 2,354,802 | 8/1944 | Doke | 403/281 |
| 2,440,412 | 4/1948 | Melchionna | 248/300 UX |
| 2,903,753 | 9/1959 | Nelsson | 52/489 X |
| 3,124,327 | 3/1964 | Meszaros | 248/301 X |
| 3,164,230 | 1/1965 | Adams | 52/489 |
| 3,257,134 | 6/1966 | Boyd et al. | 52/489 X |
| 3,300,924 | 1/1967 | Ashby et al. | 52/489 X |
| 3,430,905 | 3/1969 | Pepe | 248/300 X |

Primary Examiner—Wayne L. Shedd
Attorney, Agent, or Firm—Richard K. Thomsan; Thomas W. Buckman; Robert W. Beart

[57] ABSTRACT

A clamp for securing a wall panel to a structural support member. A cantilevered spring arm extends from and is spaced upwardly from an attachment base and includes a rib structure of decreasing height from the base to the free extremity formed on the arm to provide an increasing, variable spring rate.

6 Claims, 4 Drawing Figures

PANEL CLAMP

This is a continuation of application Ser. No. 688,199, filed May 20, 1976.

This invention relates generally to a clamp for securing a wall section to a horizontal structural member. The invention more specifically relates to the attachment of insulating or decorative walls to a structural member where the wall would be subject to wind suction forces tending to pull the wall away from the structural member.

The use of prepainted exterior insulating wall panels or precast concrete wall panels to structure quite often requires a blind fastening to the structure, e.g. without the fastener extending through the exposed face of the panel. This type of fastening, therefore, must rely primarily on the pull-out strength of a blind fastener within the material of the panel rather than a clamping load exerted on the exterior surface of the panel. Since the panels are primarily exterior walls, they are frequently subjected to high suction wind loads which tend to pull them away from the structural member. A blind attachment system in such environment should attempt to distribute the load or dampen the load to reduce the unit forces exerted in the blind fastening.

Prior art securing devices often include a clamp which comprises a base attachment surface and an offset cantilever spring arm surface designed in such a manner that the spring arm accepts and distributes loads on the system which tend to pull a panel away from a structural member.

The panel clamp of the present invention is of the general type just described but includes features which will permit the use of lighter gauge material in the manufacture of clamps without sacrificing the clamp load and relatively strong spring which is important in such a system.

The invention further incorporates a feature which allows it to be used with a variety of thicknesses of structural beam members and still provide an initial clamping force on the members.

All of the features in the panel clamp of the invention are obtained through the use of a raised rib structure extending primarily from the base toward the free extremity of the cantilever arm and which is of a decreasing height from the base toward the free extremity of the arm. The decreasing height rib will thus provide a variable spring rate which increases in strength as the load increases on the members.

DETAILED DESCRIPTION OF THE PREFERRED EMBODIMENT

Figure 1:
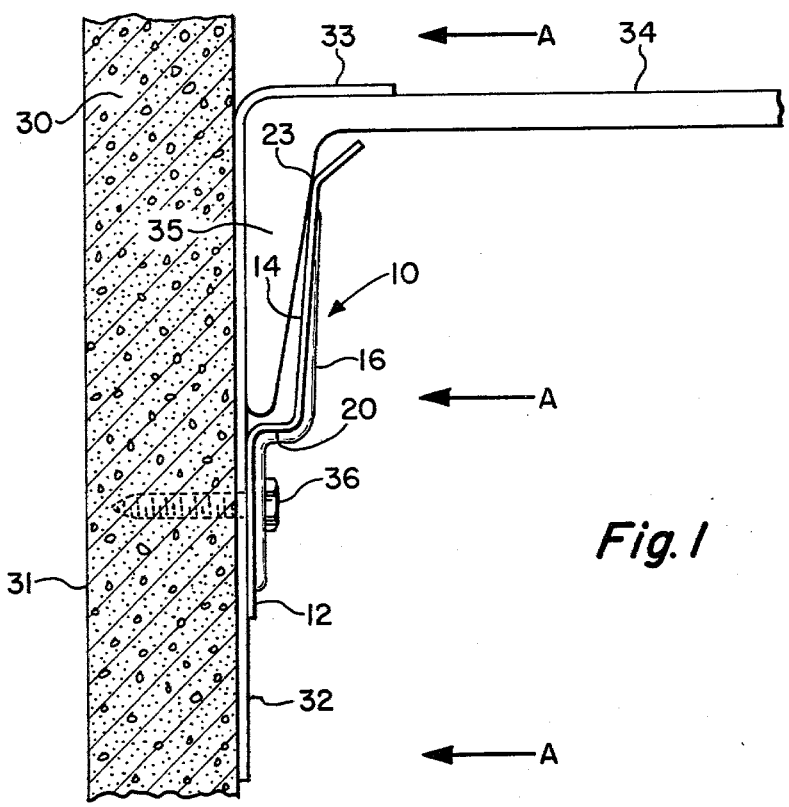
FIG. 1 is a vertical cross-sectional view through a wall section and showing the clamp of the invention securing a wall panel to a structural member.

Referring now to the drawings, the reference numeral 10 designates the clamp of the invention and which will be seen to include basically a base attachment surface 12, an upstanding web 20 and a laterally extending cantilever arm 16. The arm 16 extends from the web 20 in a direction opposite to the direction of base 12 and is spaced upwardly therefrom. Spring arm 14 is preferably formed so that its free extremity forming a primary engagement surface 23 is inclined downwardly from the region 24 of the juncture of the arm with the web.

Attention is directed to the rib structure 16 which is formed on the arm 14 and extends also onto the web 20 and the supporting base 12. The rib, as shown in FIG. 4, is an embossment on a thin gauge sheet steel device. In accordance with the invention, the height of this rib will decrease from the junction point 24 toward the primary bearing point 23 in a manner as shown in FIGS. 1 and 3.

The rib 16 formed on the cantilever spring arm allows the clamp 10 to possess a rather stiff spring while using a thin gauge material. The thicknesses and sizes of structural steel members, such as 34 in FIG. 1, vary considerably on the construction job sites. Therefore, it is important to note that the clamp in the unloaded condition as shown in FIG. 3 will have a variable spring rate allowing initial forces exerted on the arm, at contact point 23, to be overcome easily. This capability is important because the clamp 10 can be used with a range of thicknesses of structural members 34 and still produce an initial clamp load in the system.

It should be recognized that if a variable spring rate were not provided to a clamp of this type, the strong spring concept built into the system to accommodate wind loads could not readily be overcome to permit the base 12 to be clamped tightly against the panel when an oversized structural member is used in the joint.

Figures 2, 3, 4:
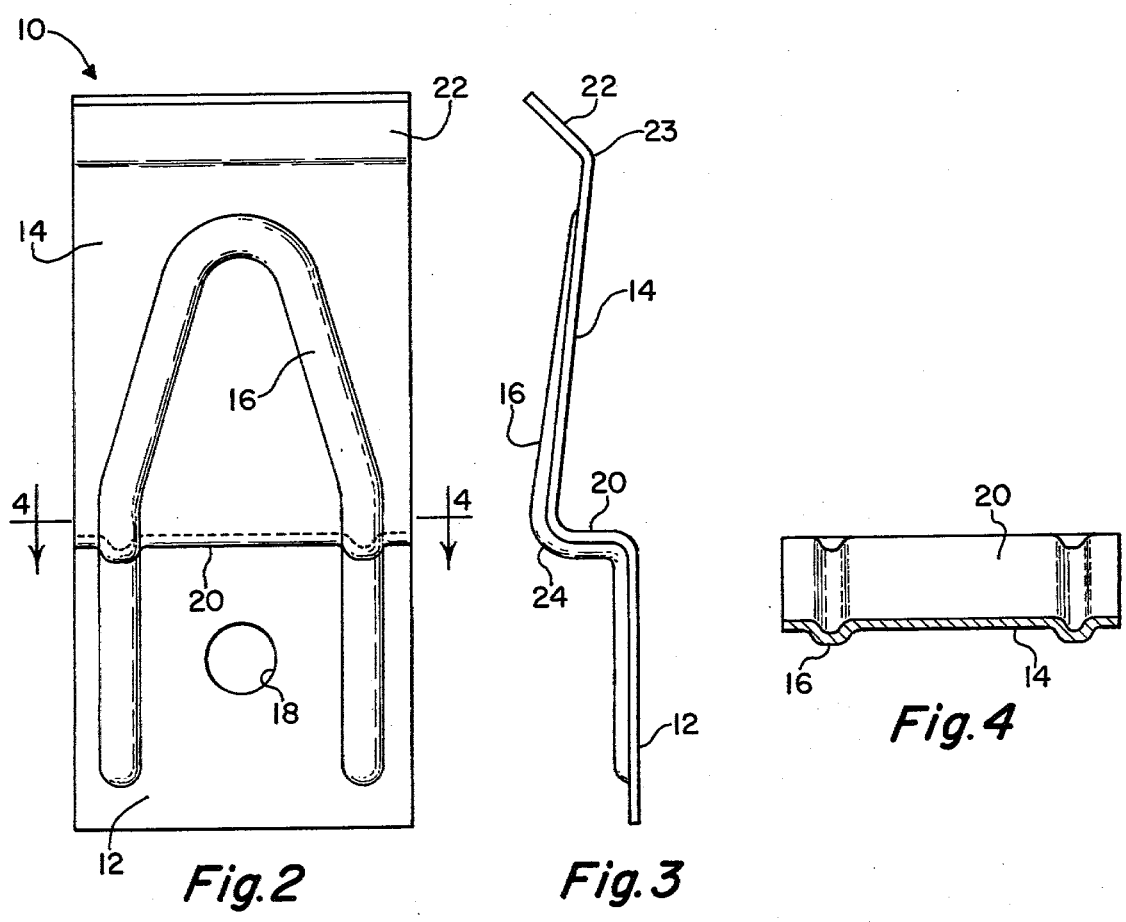
FIG. 2 is a top plan view of the clamp.
FIG. 3 is a side elevational view of the clamp.
FIG. 4 is a cross-sectional view of the clamp taken along lines 4—4 of FIG. 2.

A review of the application and environment of the clamp 10 as shown primarily in FIG. 1 will further illustrate the structural features and functions stated above. A wall panel 30, which may be of a precoated, insulative material or a precast concrete material, is secured to the interior structure of a building providing a resilient joint through the use of clamp 10. A typical but not limiting structure upon which the panel 30 is to be secured would be a horizontal structural steel beam 34 and a vertical support bracket 32, such as is shown in FIG. 1. A blind fastener 36 is positioned through an aperture 18 in the base 12 of the clamp and secured to the inner surface of wall 30 and preferably does not penetrate the exposed surface 31 of the wall. The fastener tightly clamps the base 12 and support bracket 32 against the inner surface of the panel so that the horizontal ledge 33 of the support bracket abuts and rests upon the upper surface of the beam 34. The extending arm 14 will have been positioned over an end section 35 of a structural steel member 34 prior to tightening and clamping the fastener. The clamp 10 will be capable of providing an initial clamp load in the system for a range of thicknesses of end section 35 so that the location of the bearing point 23 of the clamp on the tapered surface of the end section 35 is not critical. Wind suction forces exerted on the panel in direction A are resisted and dampened through the use of the heavy or stiff spring which will come into effect primarily at the junction point 24 and extending outwardly onto the spring arm 14 with the rib 16 at or near its maximum thickness. Thus the clamp 10 will provide an initial spring load which can be easily overcome to secure the clamp in the position shown in FIG. 1 and still have a strong spring in the system to resist the heavy loads which might be exerted on the structure.

An upstanding flange 22 may be provided adjacent the extremity of the spring arm 14 to facilitate association with the structural member 34. The generally U-shaped configuration of rib 16 at the extremity of the arm is also contributory to the variable spring leg desired in the environment.

While the invention has been described with particular reference to a preferred embodiment, it will be understood that it is not intended to limit the invention to that embodiment. On the contrary, it is intended to cover all alternatives, modifications and equivalents as may be included within the spirit and scope of the invention and as defined by the appended claims.

I claim:

1. In a building assembly system for resiliently securing erect facing panels to structural members, the combination of a facing panel member, a structural beam member with an L-shaped securing extremity and a clamp device designed for resilient securement of the inner surface of the panel member to the downwardly extending leg on the structural member, the downwardly extending leg being of a tapered cross-section with its cross-sectional width being greatest at the juncture of the L, the clamp device for resiliently securing a panel member to a structural member including a base portion integrally connected to a spring arm portion by a web extending generally upwardly from the base portion, the arm and base portions extending in opposing lateral directions from the web, the arm having a free extremity forming a force accepting point and extending downwardly from the web at an acute angle toward the plane of the base thereby creating a cantilever spring biased toward the plane of the base, the force accepting point at the free extremity of the cantilever spring permitting resilient point contact between the spring arm and the surface of the leg on the structural member in a region of thickness which is greater than the distance between the plane of the base and the contact point when the spring arm is in an unloaded condition, the resilience of the spring arm in conjunction with the downward extension thereof permitting the clamping device to engage the leg portions of structural members having a predetermined range of thicknesses, a flange extending outwardly and upwardly from the force accepting point to facilitate association between the free extremity of the spring arm and the structural member, rib means formed on the arm extending lengthwise of the arm, the rib means being of decreasing height from a region adjacent the web to the region adjacent the free extremity, the base portion being clampingly secured to the panel member with a fastener having a shank and clamping head with the free extremity of the arm resiliently bearing on the structural member, wherein the arm creates a resilient clamping force on the structural member which force increases as the strain on the arm in the direction away from the plane of the base increases.

2. The building assembly system of claim 1, including an L-shaped support bracket with a base region clampingly interposed between the inner surface of the panel and the arm of the structural member as well as the base of the clamp device so that an arm extension of the bracket is vertically supported on the top of the structural member serving to vertically align and support the assembly.

3. The clamp device of claim 1, wherein rib means are formed on the web and base as a continuation of the rib means on the arm.

4. The clamp device of claim 1, wherein the rib means are generally U-shaped in plan configuration on the arm with the bight of the U-shaped configuration located adjacent the free extremity of the arm.

5. The clamp device of claim 4, wherein the U-shaped configuration tapers toward the bight portion.

6. The clamp device of claim 1, wherein the base includes an aperture to receive the shank of a fastener therethrough.

* * * * *